(12) United States Patent
Shah et al.

(10) Patent No.: US 12,481,917 B2
(45) Date of Patent: Nov. 25, 2025

(54) TIME SERIES FORECASTING WITH EXOGENOUS VARIABLE DATA

(71) Applicant: INTERNATIONAL BUSINESS MACHINES CORPORATION, Armonk, NY (US)

(72) Inventors: Syed Yousaf Shah, Yorktown Heights, NY (US); Petros Zerfos, New York, NY (US); Xuan-Hong Dang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 17/699,567

(22) Filed: Mar. 21, 2022

(65) Prior Publication Data

US 2023/0297881 A1  Sep. 21, 2023

(51) Int. Cl.
*G06N 20/00* (2019.01)

(52) U.S. Cl.
CPC .................................. *G06N 20/00* (2019.01)

(58) Field of Classification Search
CPC ............ G06N 20/00; G06N 3/08; G06N 3/09; G06Q 10/04; G06Q 30/0202; G06F 17/18; G06F 11/3452
See application file for complete search history.

(56) References Cited

U.S. PATENT DOCUMENTS

| | | | |
|---|---|---|---|
| 7,251,589 B1 | 7/2007 | Crowe | |
| 8,014,983 B2 | 9/2011 | Crowe | |
| 9,665,830 B2 | 5/2017 | Cheng | |
| 10,671,931 B2 | 6/2020 | Bansal | |
| 10,685,283 B2 | 6/2020 | Li | |
| 2016/0026930 A1 | 1/2016 | Cheng | |
| 2017/0169446 A1* | 6/2017 | Li | G06Q 30/0202 |
| 2017/0220939 A1 | 8/2017 | Bansal | |
| 2020/0143246 A1 | 5/2020 | Li | |

FOREIGN PATENT DOCUMENTS

CN      108416636 A     8/2018

OTHER PUBLICATIONS

Hyndman, R.J., & Athanasopoulos, G. (2018) Forecasting: principles and practice, 2nd edition, OTexts: Melbourne, Australia. OTexts.com/fpp2 (Year: 2018).*
"9.2 Regression with ARIMA Errors in R", 5 pps., Downloaded from the Internet on Mar. 16, 2022, <https://otexts.com/fpp2/regarima.html>.
"ARIMAX models—PyFlux 0.4.7 documentation", Downloaded from the Internet on Mar. 16, 2022, 8 pps., <https://pyflux.readthedocs.io/en/latest/arimax.html>.

(Continued)

*Primary Examiner* — Schyler S Sanks
(74) *Attorney, Agent, or Firm* — David K. Mattheis

(57) ABSTRACT

Providing time-series forecasting by receiving target variable data and exogenous variable data, training a plurality of time-series models according to the target variable data and the exogenous variable data, determining a historical error for each of the plurality of time series models, and providing a time-series forecasting model having a lowest historical error.

20 Claims, 4 Drawing Sheets

(56) References Cited

OTHER PUBLICATIONS

Chiu et al., "Ttl: Modelling and Forecasting of Greenhouse Whitefly Incidence Using Time-Series and ARIMAX Analysis", Publication Ttl: IFAC-Papers Online, vol. 52, No. 30, pp. 196-201, 2019, Publisher: Elsevier B.V., Country of Publication: Netherlands, ISSN:2405-8963, Database: Inpec(R), (Abstract Only).

Hyndman, "The ARIMAX model muddle", Hyndsight, Oct. 4, 2010, forecasting, R, statistics, 16 pps., Downloaded from the Internet on Mar. 16, 2022, <https://robjhyndman.com/hyndsight/arimax/>.

Motrenko et al., "Ttl: Combining endogenous and exogenous variables in a special case of non-parametric time series forecasting model", Publication Ttl: Moscow University Computational Mathematics and Cybernetics vol. 40, No. 2, pp. 71-78, 2016, Publisher: Springer, Country of Publication: Germany, ISSN:0278-6419, Database: Inpec(R), (Abstract Only).

Sarkar et al., "Ttl: Forecasting long range dependent time series with exogenous variables using ARFIMAX mode", Publication Ttl: Indian Journal of Agricultural Sciences, vol. 90, No. 7, pp. 1302-1305, 2020, Publisher: Indian Counc Agricultural Res; Country of Publication: India, ISSN:0019-5022, Database: SciSearch(R).

\* cited by examiner

TIME SERIES FORECASTING WITH EXOGENOUS VARIABLE DATA

FIELD OF THE INVENTION

The disclosure relates generally to the selection of a time-series forecasting model incorporating exogenous variable data. The disclosure relates specifically to training a plurality of model variants including exogenous variable data and selecting a trained variant for use according to variant historical error levels.

BACKGROUND

Time series forecasting models, including models integrating exogenous data are well known. Such models may include the use of ARIMAX (autoregressive integrated moving average models including exogenous time series data) models for forecasting based upon historic target variable and external variable data.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the provision of time-series forecasting models Aspects of the invention disclose methods, systems and computer readable media associated with providing time-series forecasting by receiving target variable data and exogenous variable data, training a plurality of time-series models according to the target variable data and the exogenous variable data, determining a historical error for each of the plurality of time series models, and providing a time-series forecasting model having a lowest historical error.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
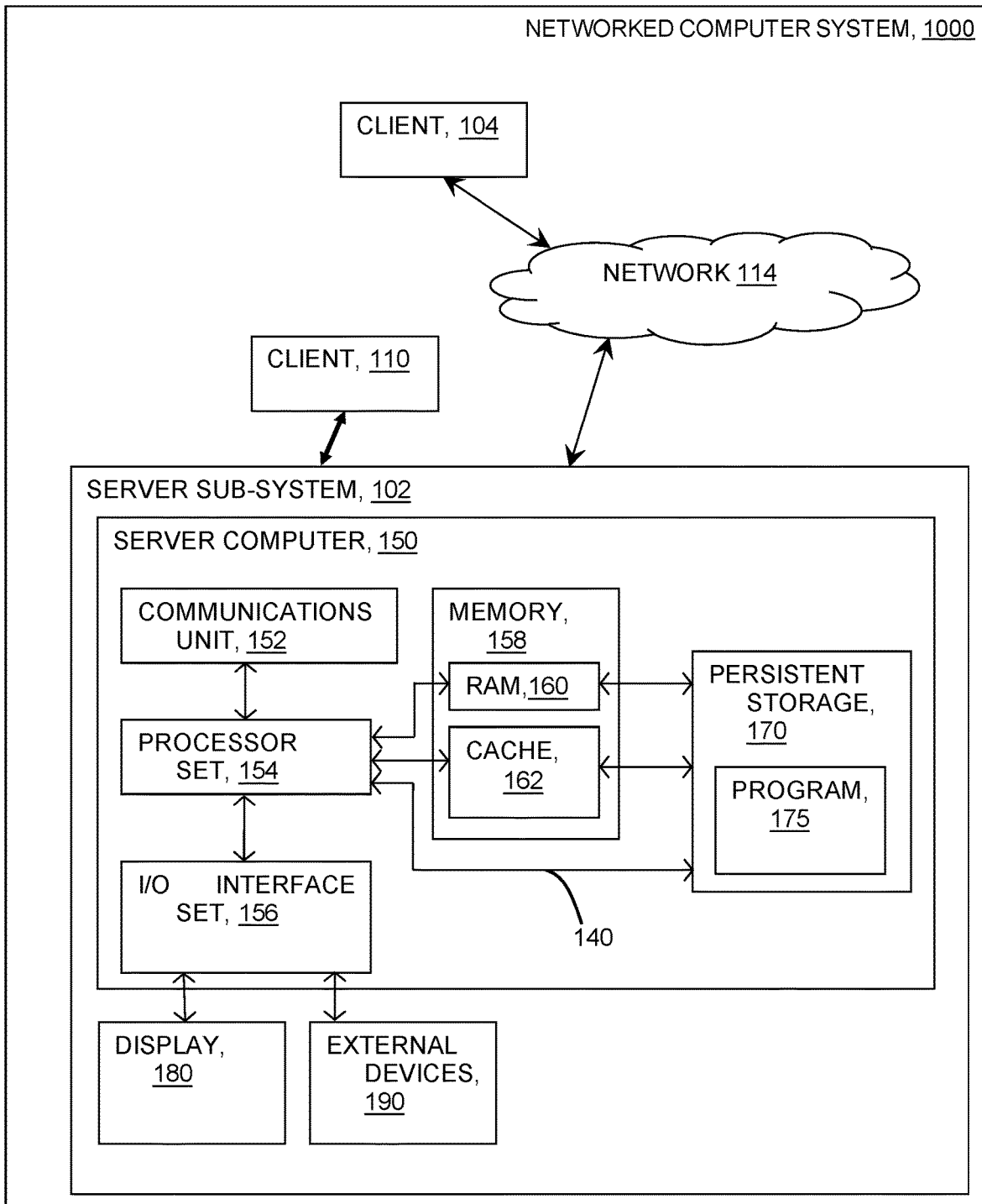
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Exogenous variable time-series data may be considered as an extra predictor for time-series forecasting models. Such data may improve target variable prediction accuracy. Any forecasting model should be able to utilize exogenous data both in training the model and in forecasting using the trained model. As an example, current temperature data may improve the accuracy of ice cream sales forecasts.

The exogenous data may be utilized in a number of differing scenarios, including a user preference for giving preference to the exogenous data in the forecasting phase, a user preference that greater preference be given to the target variable data in forecasting, user preference for maintaining an equal preference for each of the target and exogenous data sets during forecasting, a user preference for use of target data during training and both target and exogenous data at forecasting to maintain a model based exclusively upon target variable data, and a user preference to enable an automated system to evaluate all model options and select the most accurate forecasting approach utilizing exogenous variable time-series data, based upon historic prediction accuracy.

Aspects of the present invention relate generally to time-series forecasting with the inclusion of exogenous variable data in the forecasting model training phase, the target variable prediction phase, or both phases. Disclosed methods include determining as a baseline that the exogenous data provides a prediction benefit to the model, then potential forecasting models using different handling of regression model error residuals. Method evaluates each potential model using historic data to identify the model having the lowest error level with regard to predictions using the historic data and select the best performing regression model including the exogenous data for use in time-series forecasting for the target variable.

In accordance with aspects of the invention there is a method for automatically configuring and evaluating a plurality of time-series forecasting model including the use of exogenous data in either the model training, the forecasting, or both. Methods perform multi-variate linear regression upon corresponding sets of target and exogenous time-series data to determine a benefit from incorporating the exogenous data for forecasting. Methods configure and train multiple regression models, each potential model handling regression error residuals in a unique manner. Model evaluation includes the use of historic time-series data to generate predictions with known historic outcomes, then selecting the model having the lowest historic prediction error level for use in forecasting time-series data for the target variable.

Aspects of the invention provide an improvement in the technical field of time-series forecasting systems. Conventional forecasting utilize user input to determine the use of exogenous data in the training and forecasting phases of models. Such systems depend upon a user's expertise or experience in making such selections, rather than real-time relationships between differing options and forecasting accuracy. In many cases, users do not have data in advance that tells them how best to utilize exogenous data. As a result, the user selection is often only a guess that may or may not produce satisfactory results. In some cases, however, users might have useful intuition about how frequently they want the system to provide an answer to a question. Implementations of the invention leverage this knowledge by utilizing an evaluation of multiple different forecasting models to identify a model having the lowest historic error level—or, the highest historic accuracy level.

Aspects of the invention also provide an improvement to computer functionality. In particular, implementations of the invention are directed to a specific improvement to the way time-series forecasting systems operate, embodied in the configuration and evaluation of multiple time-series models, each potential model utilizing differing regression error handling processes. The models handling both target and exogenous data in at least one of the trainings and forecasting phases, the method selecting a model for forecasting based upon historic error levels, accuracy levels. In embodiments, the system trains the set of potential models using historic time-series data for each of the target and exogenous variables, after determining that the use of the exogenous variables provides a prediction accuracy benefit for forecasting. Methods evaluate potential models according to error level for predictions based upon historic data with known historic results. Forecasting proceeds with those models having the lowest level of historic error, yielding a time-series forecasting system having a higher level of accuracy.

As an overview, a time-series forecasting system receives historic target variable data, trains a time-series forecasting model and provides predictions for the target variable going forward. Such models may include the use of exogenous variable data in at least one of the trainings and forecasting phases of the model. Selection of an uncorrelated exogenous variable may result in a model wherein the exogenous data yield no improvement in the prediction accuracy of the forecasting of the model. Initial evaluation determine an actual correlation between a use of exogenous data and forecasting accuracy. Disclosed methods automatically configure, evaluate, and select an optimal forecasting model incorporating exogenous data for the time-series forecasting required by a user.

In an embodiment, one or more components of the system can employ hardware and/or software to solve problems that are highly technical in nature (e.g., receiving target and exogenous variable data, training a plurality of time-series forecasting models according to the target variable data and the exogenous variable data sets, determining a historic error level for each of the plurality of models, providing time-series forecasting for the target variable using a time-series forecasting model having a lowest historic error level, etc.). These solutions are not abstract and cannot be performed as a set of mental acts by a human due to the processing capabilities needed to facilitate automated time-series forecasting model development and implementation, for example. Further, some of the processes performed may be performed by a specialized computer for carrying out defined tasks related to developing and implementing time-series forecasting models. For example, a specialized computer can be employed to carry out tasks related to the automated configuration, evaluation and utilization of time-series forecasting models, or the like.

In an embodiment, automated methods configure and evaluate ARIMAX variants using exogenous variable time series data in addition to target variable time-series data. ARIMAX is regression with ARIMA (autoregressive integrated moving average) error residuals. The ARIMA error residuals may be incorporated into the time-series forecasting models in a number of differing ways. Each such variant yields a model having differing weights for each of the target data and exogenous data in each of the training and forecasting stages. Different variants have greater or lesser applicability to given scenarios according to the specific target and exogenous data sets as well as the forecasting requirements of the users.

In an embodiment, as an initial measure, methods perform a multi-variate regression analysis of the target and exogenous data sets to determine as a baseline, any added value represented by the inclusion of the exogenous data. For example, further application of the automated model configuration, evaluation, and selection method serves no purpose for scenarios where the addition of exogenous data to the target time-series data does not correlate with any improvement in model forecasting accuracy.

After determining that the addition of exogenous time-series data yields an improvement to model forecasting, methods configure a set of ARIMAX regression models with error residuals. Among the set, the method may configure the following ARIMAX models with error residuals: As a reference implementation, an RSR model, regression with subtracted error residuals. Such a model includes the use of the model training equations $y_t - \eta_t = \beta_0 + \beta_1 x_t$; and $\eta_t = \phi_1 \eta_{t-1} + \in_t$, where $\{\beta_0, \beta_1, \phi_1\}$ are parameters to be estimated, $y_t$ is the target time series, $x_t$ is a vector of regressors which can involves exogenous features and past values of the time series, and ηt is referred to as the residual at timepoint t. For forecasting, the RSR model uses: $\hat{y}_t = \beta_0 + \beta_1 x_t + \eta_t$. The RSR model appears to give more importance to the target variable and RSR model predictions follow more of the pattern of targets than that of the exogenous variable time-series data.

An RAR model, regression with added error residuals, includes the use of model training equations: $y_t + \eta_t = \beta_0 + \beta_1 x_t$; and $\eta_t = \phi_1 \eta_{t-1} + \in_t$. For forecasting the RAR model utilizes the equation: $\hat{y}_t = \beta_0 + \beta_1 x_t - \eta_t$. The RAR model appears to give more importance to exogenous time series data and predictions follow more of the pattern of the exogenous variable data than that of the target variable data.

An RSAR model, regression with subtracted adjusted error residuals, includes model training equations $y_t - \eta_t + \in_t = \beta_0 + \beta_1 x_t$; and $\eta_t = \phi_1 \eta_{t-1} + \in_t$, and forecasting equation $\hat{y}_t = \beta_0 + \beta_1 x_t + \eta_t$. The RSAR model gives roughly equal importance to both target and exogenous variable data, but the exogenous data appears to have a greater impact upon the forecast predictions.

A PALR, prediction adjusted linear regression, accumulates residuals over the training data and adds the residuals during forecasting according to $\hat{y}_t = \beta_0 + \beta_1 x_t + \eta_t$. The PALR model training includes the target time-series data and residuals are added at prediction time. Residuals are computed and accumulated over training data but are not added at training time hence training is not impacted by residuals like in RAR, RSR, RSAR cases. Only the final residual values & their statistics are maintained not the full historical values. Only predictions are adjusted with the computed residuals.

A training adjusted linear regression model (TALR) includes model training equations $y_t - \eta_t = \beta_0 + \beta_1 x_t$, and $\eta_t = \phi_1 \eta_{t-1} + \in_t$, together with forecasting equation $\hat{y}_t = \beta_0 + \beta_1 x_t$. As opposed to PALR, a TALR model trained with residuals subtracted from target values, however predictions are not adjusted as in a PALR In an embodiment, after configuring the set of regression models, the method evaluates each model using labeled historic data to determine a prediction error level for the historic data. In this embodiment, the method selects the configured model having the lowest level of error from the historic predictions as the model for use in forecasting time-series data for the user.

In an embodiment, the differencing of the models may be configured such that all time-series data is differenced, or such that only the target variable time-series data is differenced. The regression residuals may also be configured such that the residuals are also differenced. In this embodiment, the difference order is automatically computed and applied.

In an embodiment, the method receives target and exogenous data. The method may further receive a user preference regarding the regression variant to use for forecasting. In this embodiment, the method configures and trains the user specified variant and utilizes the trained variant for forecasting time-series data. In this embodiment, when the method does not receive a user preference, the method proceeds as outlined above with the configuration, training and evaluation of multiple regression variants, selects the variant having the lowest level of historic prediction error and utilizes that variant for forecasting time-series results.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise timeseries data set selection program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the time-series forecasting model generation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., time-series forecasting model generation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
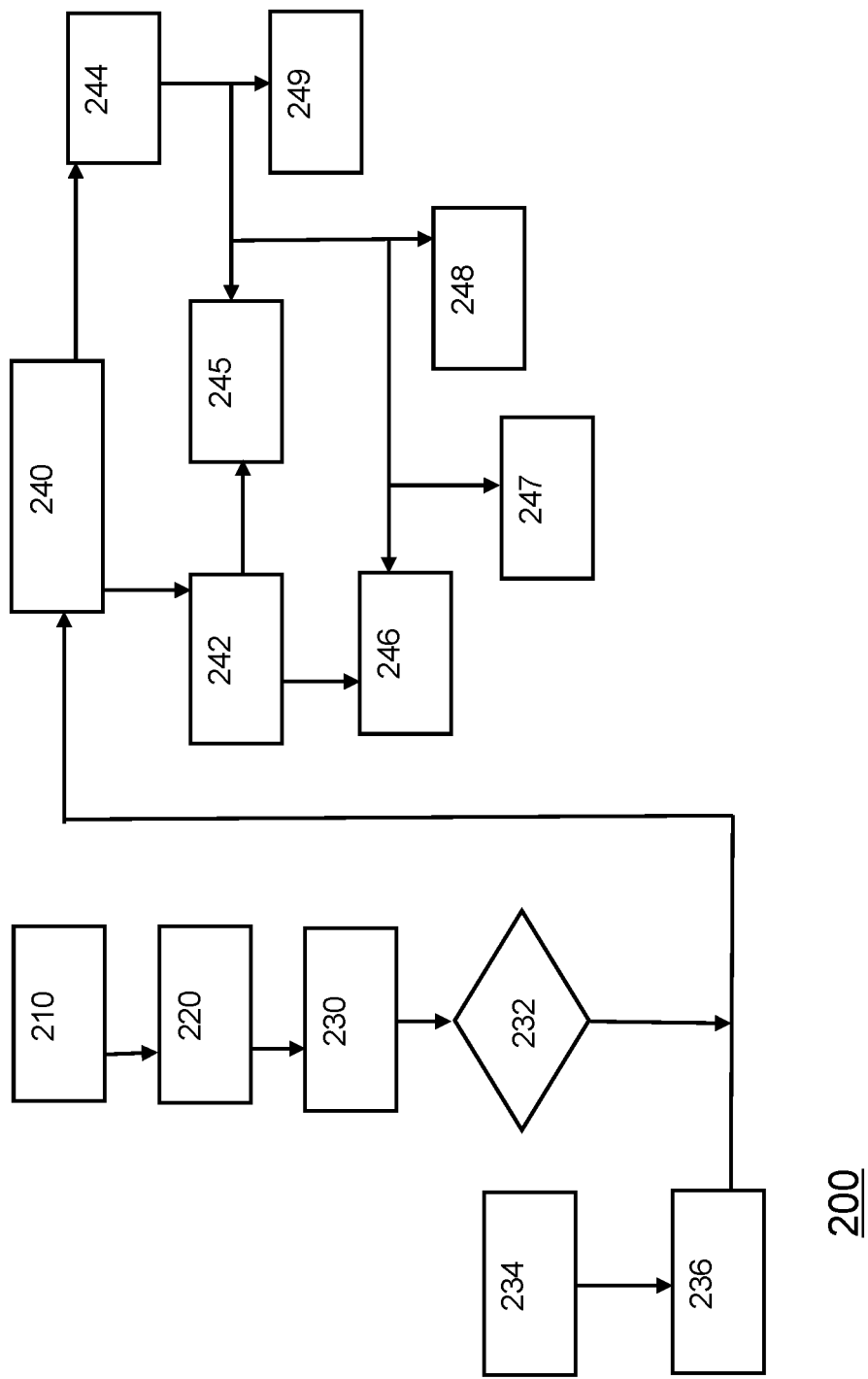
FIG. 2 provides a flowchart depicting an operational sequence, according to an embodiment of the invention.

FIG. 2 provides a flowchart 200, illustrating exemplary activities associated with the practice of the disclosure. After program start, the method receives exogenous and target variable time series data, such as weather data, economic data, sales data, or other time series data.

At block 220, the method determines an order for the target variable data by analyzing the data trends over time. At block 230 the method differences the target variable time-series data, evaluating the differences between successive time-series values with consideration for the order determined at block 220. At block 232, the method evaluates the exogenous time-series data determining if the exogenous data has a uniform difference or has difference variations.

For exogenous data having varying differences, the method determines the exogenous time-series data order at block 234. At block 236, the method determines the differences for the exogenous data taking the difference order from block 234 into consideration.

The differenced target and exogenous data sets pass to block 240. At block 242, the method trains a differenced multi-variate linear regression model to evaluate the effect, if any of the addition of exogenous data to the target data set, this returns a trained DMLR model at 243. At block 244, the method uses the differences target and exogenous data sets for training a base ARIMA model together with determining the ARIMA error residuals. The AIRMA error residuals are computed using trained ARIMA model, the coefficients of ARIMA model are automatically determined during training. The ARIMA residuals are used to compute regression residuals using ARIMA coefficients. These regression residuals or error residuals are subsequently used, together with the trained DMLR model in training a PALR model, block 245, and a TALR model, block 246, the ARIMA model and residuals are used in training an RAR model, block 247, an RSAR model, block 248, and an RSR model, block 249. The method uses historic data to evaluate the prediction accuracy of each of the trained models, then selects the model having the lowest level of historic prediction error for the current target variable and exogenous variable time-series data, as the forecasting model for the current user's needs. The method utilizes the selected model to forecast target variable time-series data for the user. Based on the model, the forecasting method utilizes regression residuals along with multi-linear regression coefficients to produce forecasts.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
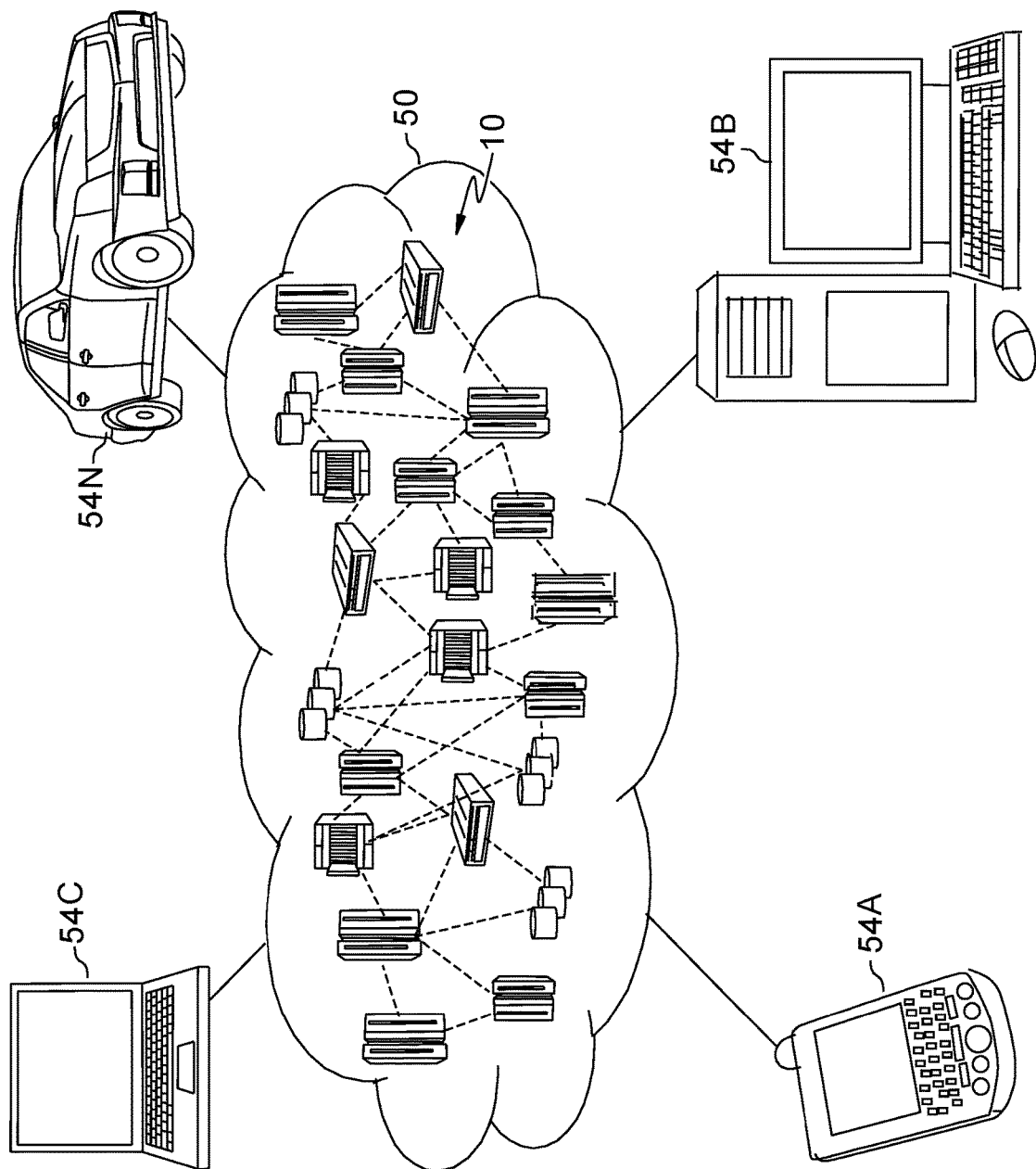
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
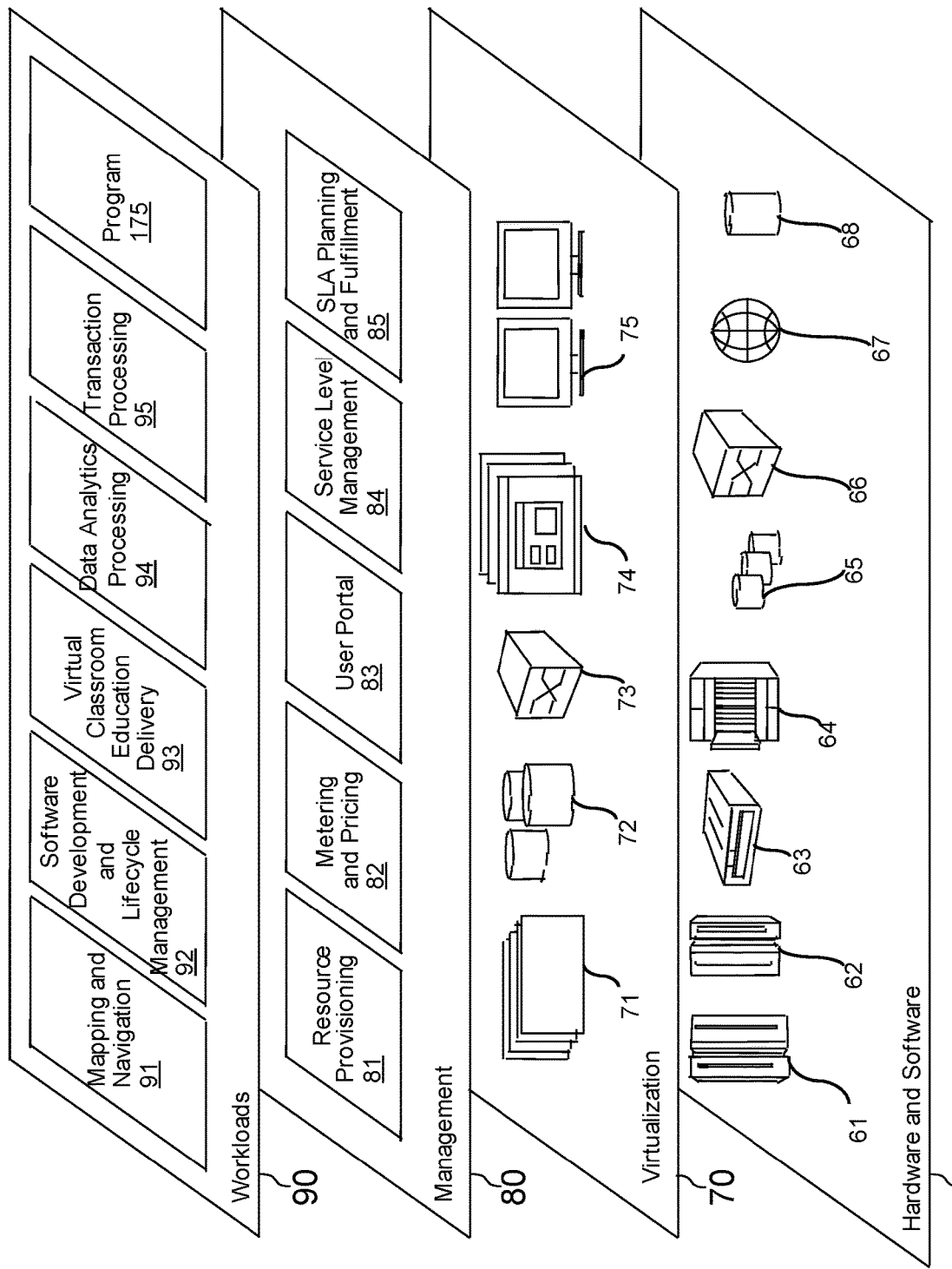
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and time-series forecasting model generation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
   receiving, by one or more computer processors, target variable data and exogenous variable data;
   training, by the one or more computer processors, a differenced multi-variate linear regression (DMLR) model using the target variable data and the exogenous variable data:
   training, by the one or more computer processors using differenced target variable and exogenous variable data sets, a base autoregression integrated moving average (ARIMA) model;
   determining ARIMA error residuals, by the one or more computer processors using the base ARIMA model;
   determining regression residuals, by the one or more computer processors using the ARIMA residuals and ARIMA coefficients;
   training, by the one or more computer processors using the DMLR model and the regression residuals, a first portion of a plurality of time-series models according to the target variable data and the exogenous variable data;
   determining, by the one or more computer processors, a historical error for each of the plurality of time series models;
   providing, by the one or more computer processors, a time-series forecasting model having a lowest historical error; and
   using, by the one or more computer processors the time-series forecasting model to forecast target variable time-series data for a user.

2. The computer implemented method according to claim 1, further comprising training, by the one or more computer processors using the ARIMA model and the regression residuals, a second portion of the plurality of time-series models according to the target variable data and the exogenous variable data, wherein at least one of the plurality of time-series models comprises a regression with the regression residuals added model.

3. The computer implemented method according to claim 2, wherein at least one of the second portion of the plurality of time-series models comprises a regression with the regression residuals subtracted model.

4. The computer implemented method according to claim 2, wherein at least one of second portion of the plurality of time-series models comprises a regression with the regression residuals adjusted and subtracted model.

5. The computer implemented method according to claim 1, wherein at least one of first portion of the plurality of time-series models comprises a prediction adjusted linear regression model.

6. The computer implemented method according to claim 1, wherein at least one of first portion of the plurality of time-series models comprises a training adjusted-linear regression model.

7. The computer implemented method according to claim 1, further comprising performing a multi-variate regression analysis of the target and exogenous variable data.

8. A computer program product comprising one or more computer readable storage devices and collectively stored program instructions on the one or more computer readable storage devices, comprising program instructions which, when executed, cause a computing system to:
receive target variable data and exogenous variable data;
use the target variable data and the exogenous variable data to train a differenced multi-variate linear regression (DMLR) model:
use differenced target variable and exogenous variable data sets to train a base autoregression integrated moving average (ARIMA) model;
use the base ARIMA model to determine ARIMA error residuals;
use the ARIMA residuals and ARIMA coefficients to determine regression residuals;
train a first portion of a plurality of time-series models using the DLMR model and the regression residuals, according to the target variable data and the exogenous variable data;
determine a historical error for each of the plurality of time series models;
provide a time-series forecasting model having a lowest historical error; and
use the time-series forecasting model to forecast target variable time-series data for a user.

9. The computer program product according to claim 8, wherein the program instructions further cause the computing system to use the ARIMA model and the regression residuals to train a second portion of the plurality of time-series models according to the target variable data and the exogenous variable data, wherein at least one of second portion of the plurality of time-series models comprises a regression with regression residuals added model.

10. The computer program product according to claim 9, wherein at least one of the second portion of the plurality of time-series models comprises a regression with the regression residuals subtracted model.

11. The computer program product according to claim 9, wherein at least one of second portion of the plurality of time-series models comprises a regression with the regression residuals adjusted and subtracted model.

12. The computer program product according to claim 8, wherein at least one of first portion of the plurality of time-series models comprises a prediction adjusted linear regression model.

13. The computer program product according to claim 8, wherein at least one of first portion of the plurality of time-series models comprises a training adjusted-linear regression model.

14. The computer program product according to claim 8, wherein the program instructions further cause the computing system to perform a multi-variate regression analysis of the target and exogenous variable data.

15. A computer system comprising:
one or more computer processors;
one or more computer readable storage devices; and
stored program instructions on the one or more computer readable storage devices for execution by the one or more computer processors, comprising stored program instructions which, when executed cause the computer system to:
receive target variable data and exogenous variable data;
use a differenced multi-variate linear regression to train a (DMLR) model using the target variable data and the exogenous variable data:
use differenced target variable and exogenous variable data sets to train a base autoregression integrated moving average (ARIMA) model;
use the base ARIMA model to determine ARIMA error residuals;
use the ARIMA residuals and ARIMA coefficients to determine regression residuals;
train a first portion of a plurality of time-series models using the DLMR model and the regression residuals, according to the target variable data and the exogenous variable data;
determine a historical error for each of the plurality of time series models;
provide a time-series forecasting model having a lowest historical error; and
use the time-series forecasting model to forecast target variable time-series data for a user.

16. The computer system according to claim 15, wherein the program instructions further cause the computing system to use the ARIMA model and the regression residuals to train a second portion of the plurality of time-series models according to the target variable data and the exogenous variable data, wherein at least one of second portion of the plurality of time-series models comprises a regression with regression residuals added model.

17. The computer system according to claim 16, wherein at least one of the second portion of the plurality of time-series models comprises a regression with the regression residuals subtracted model.

18. The computer system according to claim 16, wherein at least one of second portion of the plurality of time-series models comprises a regression with the regression residuals adjusted and subtracted model.

19. The computer system according to claim 15, wherein at least one of first portion of the plurality of time-series models comprises a prediction adjusted linear regression model.

20. The computer system according to claim 15, wherein at least one of first portion of the plurality of time-series models comprises a training adjusted-linear regression model.

* * * * *